United States Patent
Raestad et al.

(10) Patent No.: US 7,242,345 B2
(45) Date of Patent: Jul. 10, 2007

(54) METHOD FOR CONTROLLING A RADAR ANTENNA

(75) Inventors: Atle Eivind Raestad, Halden (NO); Jan-Olov Winnberg, Kållered (SE); Andreas Mattsson, Askim (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 60 days.

(21) Appl. No.: 10/543,861

(22) PCT Filed: Feb. 3, 2003

(86) PCT No.: PCT/NO03/00033

§ 371 (c)(1),
(2), (4) Date: Jul. 28, 2005

(87) PCT Pub. No.: WO2004/070873

PCT Pub. Date: Aug. 19, 2004

(65) Prior Publication Data

US 2006/0139205 A1 Jun. 29, 2006

(51) Int. Cl.
*G01S 7/40* (2006.01)
*G01S 13/66* (2006.01)

(52) U.S. Cl. .............. 342/74; 342/75; 342/77; 342/81; 342/97; 342/174

(58) Field of Classification Search ............. 342/74, 342/75, 77, 81, 95–97, 174
See application file for complete search history.

(56) References Cited

U.S. PATENT DOCUMENTS

| | | | | |
|---|---|---|---|---|
| 2,658,277 A * | 11/1953 | Davis et al. | ................ | 89/202 |
| 4,034,374 A | 7/1977 | Kruger | | |
| 4,331,958 A * | 5/1982 | Lacomme | ................ | 342/152 |
| 4,375,641 A * | 3/1983 | Josefsson et al. | ............ | 342/88 |
| 4,385,298 A * | 5/1983 | Josefsson et al. | ........... | 342/162 |
| 5,131,602 A * | 7/1992 | Linick | ................ | 244/3.14 |
| 5,227,796 A * | 7/1993 | Arvidsson | ................ | 342/13 |
| 5,239,301 A | 8/1993 | Martin | | |
| 5,241,317 A * | 8/1993 | Howard | ................ | 342/149 |
| 5,313,212 A * | 5/1994 | Ruzicka | ................ | 342/101 |
| 6,359,586 B1 * | 3/2002 | Sviestins | ................ | 342/451 |
| 2006/0139205 A1 * | 6/2006 | Raestad et al. | ................ | 342/74 |

FOREIGN PATENT DOCUMENTS

JP  05150038 A  *  6/1993

OTHER PUBLICATIONS

"FIREFINDER: Position Analysis System Advanced Development Model", DiDomizio, J.; Fish, C.; Moyer, L.; Glikerdas, P. Aerospace and Electronic Systems Magazine, IEEE vol. 11, Issue 9, Sep. 1996 pp. 25-29.*

"Hybrid-integrated prism array optoelectronic targeting system", Optics and Laser Technology, Nov. 2005, vol. 37, No. 8, p. 591-6, 7, Chang-C-C, Chang-H-C, Tang-L-C, Young-W-K, Wang-J-C, Huang-K-L.*

* cited by examiner

*Primary Examiner*—John B. Sotomayor
(74) *Attorney, Agent, or Firm*—Schwegman, Lundberg, Woessner and Kluth P.A.

(57) ABSTRACT

A method is described for detecting an object with target radar. After the first detection of an object, the antenna is tilted. The original direction towards the object is restored by electronically steering the emitted beam. The beamsteering is obtained by changing the frequency of the emitted signal. Thus, the object may be detected several times on different frequencies. The method is particularly applicable in search and track radars.

3 Claims, 6 Drawing Sheets

METHOD FOR CONTROLLING A RADAR ANTENNA

TECHNICAL FIELD

The present invention relates to the field of radars for search and tracking.

TECHNICAL BACKGROUND

Currently, in radars searching and tracking the path of projectiles, successive rounds from the same gun or other trajectories will be detected and tracked with the radar using the same frequencies each time. Thus both the detection probability and the tracking errors will be correlated, since these depend on the frequency characteristics of the radar cross-section (RCS). RCS is the measure of a target's ability to reflect radar signals in the direction of the radar receiver.

Solutions are known in which the antenna orientation/position of the radar are changed. However, changing the antenna orientation/radar position will cause a period of time where the radar is not searching/tracking.

Another solution is to use two or more radars. Using several radars to get better search and tracking is expensive.

BRIEF SUMMARY OF THE INVENTION

It is an object of the present invention to provide a method in which a radar can obtain a better ability to detect and follow an object without having to relocate the radar or use more radar units.

This is obtained in a method as defined in the appended claims.

Briefly, the method consists of mechanically tilting the antenna and compensating for the tilting with beamsteering, said beamsteering being performed by changing the frequency of the emitted signal. For successive rounds from the same gun or other trajectories that are repeated, each round will be tracked using different frequencies. As a consequence, the detection probability will increase and the tracking error will be reduced, without the need for a break in operation time or the use more than one radar.

BRIEF DESCRIPTION OF THE DRAWINGS

The invention will now be described in detail in reference to the appended drawings, in which.

DETAILED DESCRIPTION OF THE INVENTION

We want to steer the beam at the same place for search but with a different frequency to get a different RCS. This can be done by mechanically tilting the antenna and compensate the tilt by electrically steering, the beamsteering being performed by changing the frequency of the emitted signal. The compensation must be done while the antenna is moving. To be able to do this, we must measure the antenna orientation at a high rate. It is important that the compensation is done while the antenna is moving so we can search and track continuously.

Figure 1:
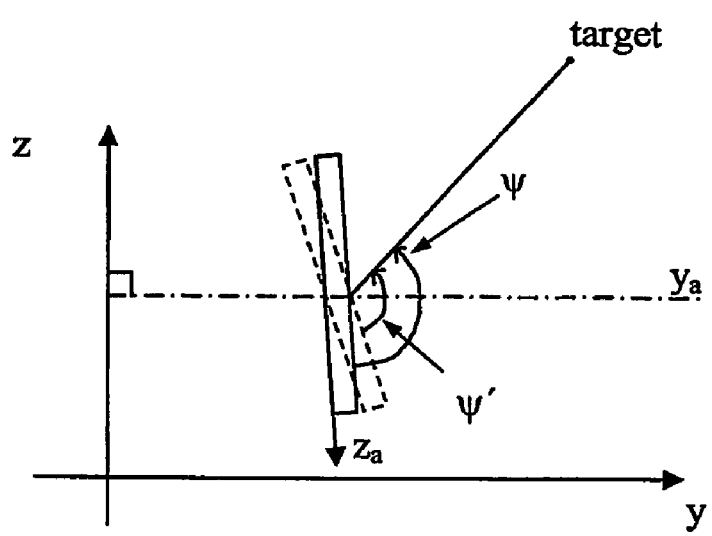
FIG. 1 shows an antenna that is being tilted in elevation.

FIG. 1 shows the antenna at two different tilt angles, but we want to steer the beam at the same target. To do this, we can change the frequency so the electrical steering of the beam compensates for the mechanical tilt difference. In the figure the electrically steering must be $\psi$ and $\psi'$.

When the radar is tracking a target it shall predict the trajectory of the target to be able to steer the beam so it follows the target. In addition to this prediction, we must also take the antenna orientation into account and predict the antenna orientation the next time we measure the target position.

Figure 2:
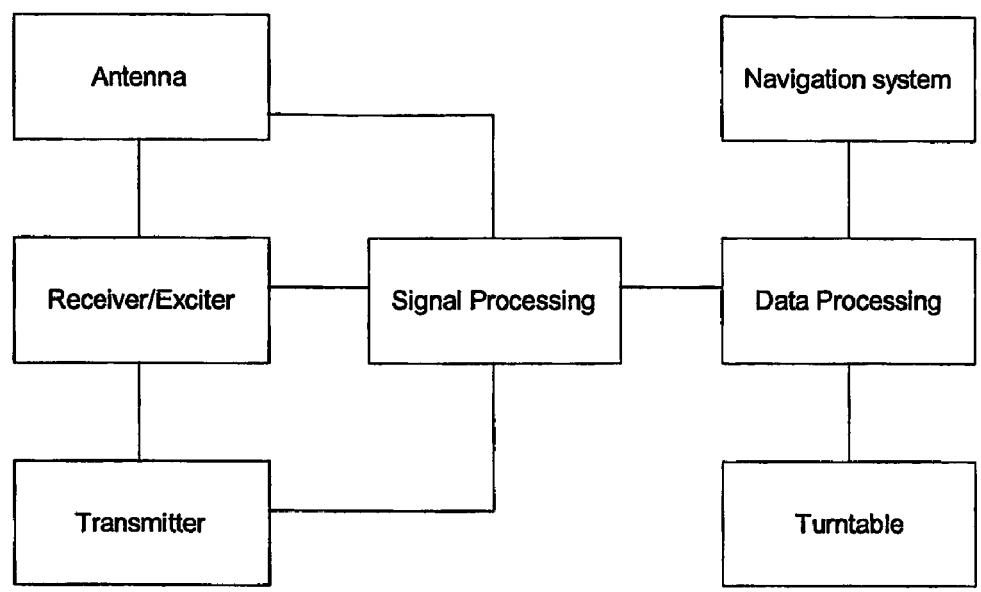
FIG. 2 is a schematic diagram of the hardware of a radar system.

A schematic diagram of the hardware is given in FIG. 2. The navigation system unit is located on the antenna and measures the antenna orientation. The turntable unit is responsible for physically/mechanically changing the antenna orientation. The Signal Processing Unit (SPU) and Data Processing Unit (DPU) can be located on the same or different hardware. These units can be constituted by PCs, workstations or real-time systems. The division of work tasks between SPU and DPU is a matter of convenience; the SPU is often a fast processing front end unit realized in discrete electronics, while the DPU is a PC that handles the signal at a lower speed. As the processing rate of PCs increases, they will be able to handle faster signals and can then take on some of the tasks from the SPU.

Sequence Diagrams

Steering the antenna orientation

Figure 3:
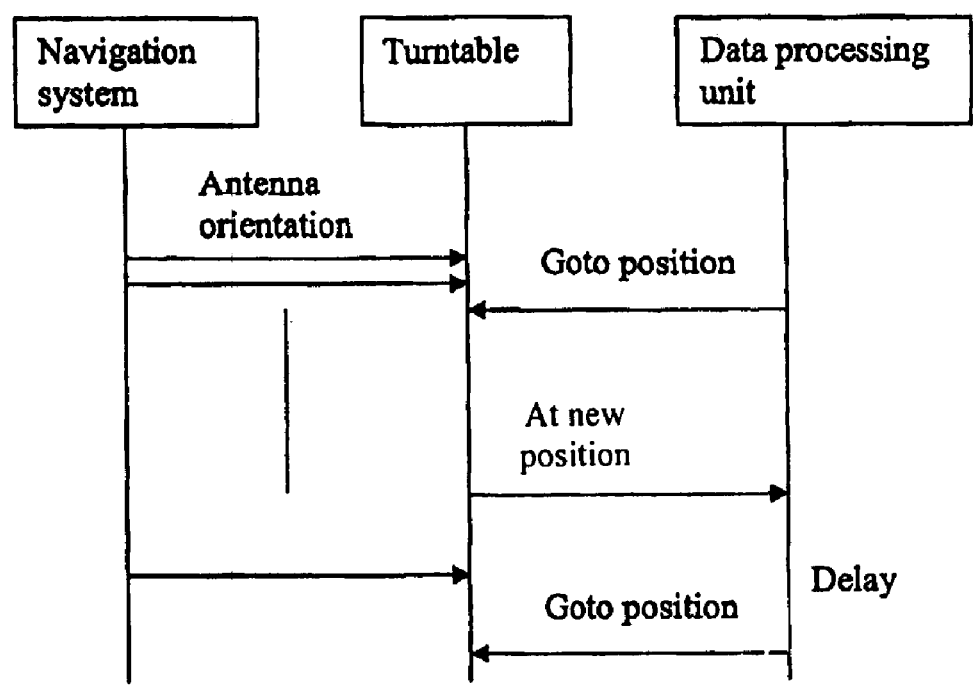
FIG. 3 is a sequence diagram showing the commands issued for changing the mechanical orientation of the antenna.

We want the antenna to mechanically move continuously or with pauses between the movements. This is done by commanding the turntable unit to change the antenna orientation, as shown in FIG. 3.

Compensate for Search

Figure 4:
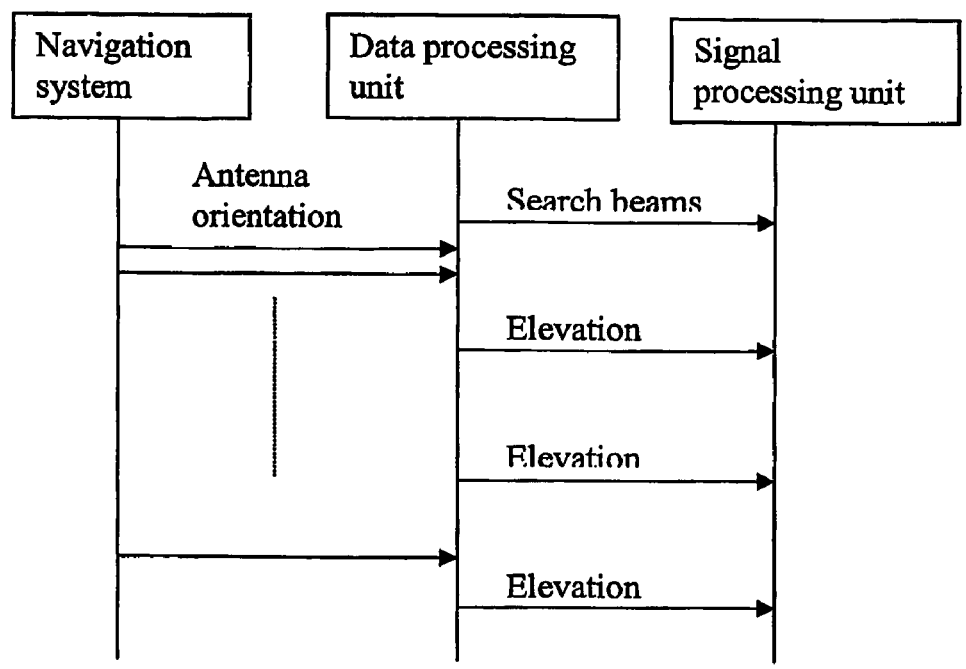
FIG. 4 is a diagram showing the commands for adjusting the search horizon in view of the new antenna orientation.

The data processing unit tells the signal processing unit where the search beams shall be. Because the antenna is moving, these search beams must be adjusted in elevation. Based on the antenna orientation, the DPU either gives the SPU new search beams or a message with elevation offsets for different elevation angles. This is shown in FIG. 4.

Compensate for Tracking

Figure 5:
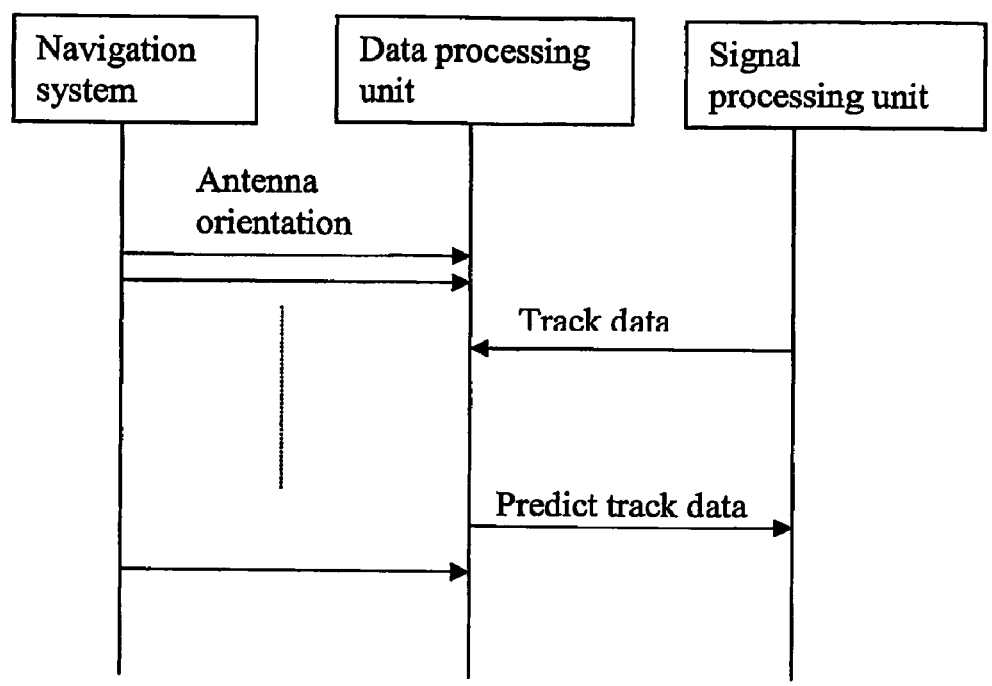
FIG. 5 is a diagram showing the sequence for predicting the next track point of a moving object.
Figure 6:
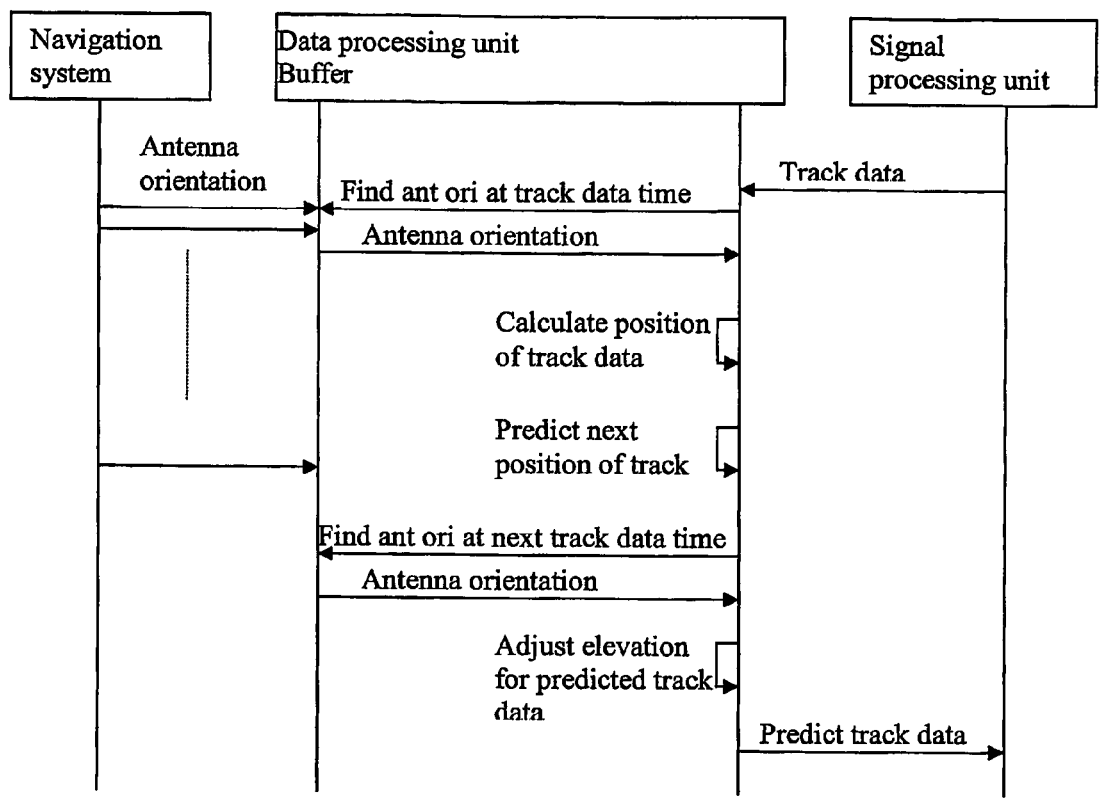
FIG. 6 is an example of how a tracking system can be implemented in a DPU.

When the radar is tracking a target, we must steer the beam where it is most likely to see the target at the next measurement. When the antenna is moving, we must also take the antenna movement into consideration. To do this we can find the position of the target when we receive a track message from the SPU, and then predict where the target is at the next measurement (predicted track point), estimate the antenna orientation at the next measurement time, and finally, adjust the predicted track point based on the information on the antenna orientation. This is shown in FIG. 5. FIG. 6 shows one possible solution in the DPU.

While the invention has been described with an antenna that is tilted in the elevation direction, the same principle can be used for adjusting the beam in any other direction.

The invention claimed is:

1. A method in a target tracking radar installation, for detecting projectiles following a trajectory, said projectiles being fired in rounds from a gun, said method comprising:

sending a radio signal at a first frequency in a beam towards a projectile from a multi element antenna, receiving and registering a signal from the first frequency reflected by said projectile, mechanically tilting the antenna;

compensating for the mechanical tilt by changing to a second frequency of the radio signal; and sending, receiving and registering subsequent, reflected radio signals sent back from projectiles following said trajectory in subsequent rounds.

2. The method as claimed in claim 1, further comprising the steps of:
determining the tilted position of the antenna and
calculating how much the frequency must be changed in order to restore the correct position of the beam.

3. The method as claimed in claim 2, wherein the radar includes
a navigation system for detecting the current position, speed and acceleration of the antenna and for
calculating a new anticipated position of a projectile and steering the beam towards the new anticipated position.

* * * * *